United States Patent [19]
Johnson

[11] 3,880,525
[45] Apr. 29, 1975

[54] METHOD AND APPARATUS FOR DETERMINING THE REFRACTIVE CHARACTERISTICS OF A LENS

[75] Inventor: John R. Johnson, Natick, Mass.

[73] Assignee: American Optical Corporation, Southbridge, Mass.

[22] Filed: May 8, 1974

[21] Appl. No.: 468,039

[52] U.S. Cl. .............................................. 356/127
[51] Int. Cl. ............................................ G01b 9/00
[58] Field of Search .......................... 356/124, 127

[56] References Cited
OTHER PUBLICATIONS
Moore et al., "Production Lens Quality Evaluation by the Simultaneous Measurement of the OTF at Three Points," Optical Engineering, Sept./Oct. 1973, Vol. 12 – No. 5, pp. 155–160.

*Primary Examiner*—Vincent P. McGraw
*Assistant Examiner*—Richard A. Rosenberger
*Attorney, Agent, or Firm*—Joel Wall; W. C. Nealon; H. R. Berkenstock, Jr.

[57] ABSTRACT

The refractive powers of a lens are determined by analyzing the displacement and directions of displacement for a plurality of at least three non-coplanar rays when the lens is inserted into a bundle of collimated rays. The plane of measurement for the displacements and directions of displacement is at a known distance beyond the lens.

15 Claims, 6 Drawing Figures

METHOD AND APPARATUS FOR DETERMINING THE REFRACTIVE CHARACTERISTICS OF A LENS

BACKGROUND OF THE INVENTION

The present invention is related to novel apparatus and methods for determining the refractive characteristics of a lens and is more particularly concerned with method and apparatus for determining such refractive characteristics through objective measurements which may be performed automatically.

Literally millions of lenses are manufactured in the United States annually. A very large percentage of these lenses are corrective ophthalmic lenses for use in spectacles. Since these ophthalmic lenses are intended to correct and protect the vision of the wearer, the lenses must be carefully examined and accurately measured in order to meet the wearer's needs.

The refractive characteristics of ophthalmic lenses which are of concern to the manufacturer, dispenser, and wearer are the spherical power, in those instances where astigmatism is present in the wearer's eye, the power in the two principal meridians, the angular locations of the principal meridians, the amount of prism correction present in the lens, and the angular location of that prism axis in the ophthalmic lens.

The manufacturer of ophthalmic lenses must carefully examine the quality of the ophthalmic lenses and also carefully measure the refractive characteristics associated with those lenses prior to shipment to various ophthalmic supply dispensers. Characteristically, the lens testing instrument utilized by manufacturers of ophthalmic lenses for testing the refractive characteristics of the lenses is a simple optical instrument dating from the early parts of the present century. Such a typical lens measuring instrument is shown in U.S. Pat. No. 1,383,678 to Tillyer et al. The basic optical characteristics of that instrument are unchanged today although modifications have been made. The instrument is extremely well suited for its intended use as evidenced by its longevity of service. However, it does require a trained experienced operator who places the lens in the device with the concave surface against the nosepiece and performs a double search for a sharp image of a barred pattern as seen in the instrument eyepiece. The parameters through which the search is performed are (1) the angular orientation of the barred pattern and (2) the sharpness of its image, i.e., its focus. The lens also must be carefully centered on the nosepiece. All of these operations require careful manipulation of the lens and continual subjective evaluations of the results. The lens testing instrument is calibrated to read the back vertex power as measured in diopters. The reciprocal of the back vertex power is the distance, in meters, between the vertex on the concave surface of the lens and its second focal point.

As can be seen from the foregoing description of the procedure, distinct subjective determinations must be made by the operator for each and every lens examined. Even with the most careful and experienced operators, differences in the readings acquired are inherent as the operator must continually adjust the instrument against a standard in order to calibrate the instrument for the condition of his own eyes as his eyes tire. In addition, as the operator tires, obviously the quality of the subjective decisions made by the operator tend to deteriorate somewhat.

However, for all the uncertainties introduced by such subjective judgments, the greatest drawback to the use of such an instrument in modern manufacturing operations is the period of time required for even the most experienced operator to test the refractive characteristics of a lens carefully. A large number of such operators is required in order to prevent the complete backup of the manufacturing process.

In the past, various schemes have been proposed in the art for automating the foregoing procedure. Among these previous attempts is one which illuminates a test lens with collimated light. Immediately behind the test lens is located an opaque mask containing two small holes symmetrically placed with respect to the axis of the system. The mask selects two bundles of rays from the refracted bundle passing through the lens. The separation of these bundles at some point downstream from the lens is a measure of the lens power. The separation is measured by placing, at this downstream location, a chopper wheel containing a single radial slit behind which is located a photodetector. The electrical signal developed as the slit crosses the first bundle of rays is utilized to start a timer. Then, knowing the chopper speed and the time between the crossings, the separation between the two bundles of rays can be determined. From this separation, the lens power may be calculated given the geometry of the optical system. This method is quite reliable for lenses having only spherical power. It is not an image forming system and the only search performed is done by the spinning chopper wheel. However, as noted hereinabove, the additional refractive characteristics associated with a large number of ophthalmic lenses, i.e., cylinder and prism, cannot be measured by this method, therefore, the method is useful only for testing lenses having only spherical power, and not for testing ophthalmic lenses.

Another prior art method illuminates the test lens with parallel light also. The use of an appropriate compensating lens behind the test lens allows a real image of the light source to form at a fixed distance from the test lens. A detector is utilized which has a nonlinear transfer characteristic so that it can be used to indicate energy density. When this detector oscillates axially through the image, the point of maximum energy density indicates the position of the focus of the combination of the test and compensating lenses. In this method, a single search is performed by the oscillating detector. In addition to this method being usable for those lenses having only spherical power, one must know, a priori, the nominal power of the test lenses to be examined such that appropriate compensating lenses may be utilized in order to keep the range of the search of the detector small enough in order to be practical. Since ophthalmic lenses are produced in a wide variety of different ophthalmic "prescriptions", an automated system must be capable of accommodating readily to that wide variety of combinations of refractive characteristics.

SUMMARY OF THE INVENTION

Accordingly, it is an object of the present invention to provide a method and apparatus for determining the refractive characteristics of a lens which is adaptable to automatic measuring techniques.

Another object is to provide such novel method and apparatus by which the subjective judgment of an operator is removed from the measuring scheme.

A further object of the invention is to provide such novel method and apparatus in which all standard ophthalmic lenses may be tested.

A still further object of the invention is to provide such method and apparatus which are sufficiently simple in design to enable the incorporation thereof into standard manufacturing processes in a manner which will be economical and reliable.

Briefly, the invention in its broadest aspect comprises method and apparatus for determining the refractive characteristics of a lens wherein the apparatus comprises the following components. A source of collimated light produces a bundle of collimated rays parallel to and surrounding an apparatus optical axis. Means is provided for positioning the lens in the bundle of collimated rays with its geometrical axis approximately aligned with the apparatus optical axis. Means is disposed adjacent to the lens for selecting a spaced plurality of at least three non-coplanar rays from the bundle passing through and being refracted by the lens. A display surface is disposed orthogonal to the apparatus optical axis and at a predetermined distance behind the lens so that the selected refracted rays are incident thereon. The display surface has a coordinate system thereon by which the displacement and direction of displacement are ascertained for the positions of incidence of the selected refracted rays relative to the positions of incidence of the selected rays on the display surface before the lens is positioned in the bundle of collimated rays. The displacements and directions of displacement of the positions of incidence of the selected refracted rays are indications of the refractive characteristics of the lens.

Further objects, advantages, and features of the invention will be apparant in the arrangement and construction of the constituent parts, in detail, as set forth in the following specification taken together with the accompanying drawing.

DETAILED DESCRIPTION OF THE PREFERRED EMBODIMENTS

Figure 1:
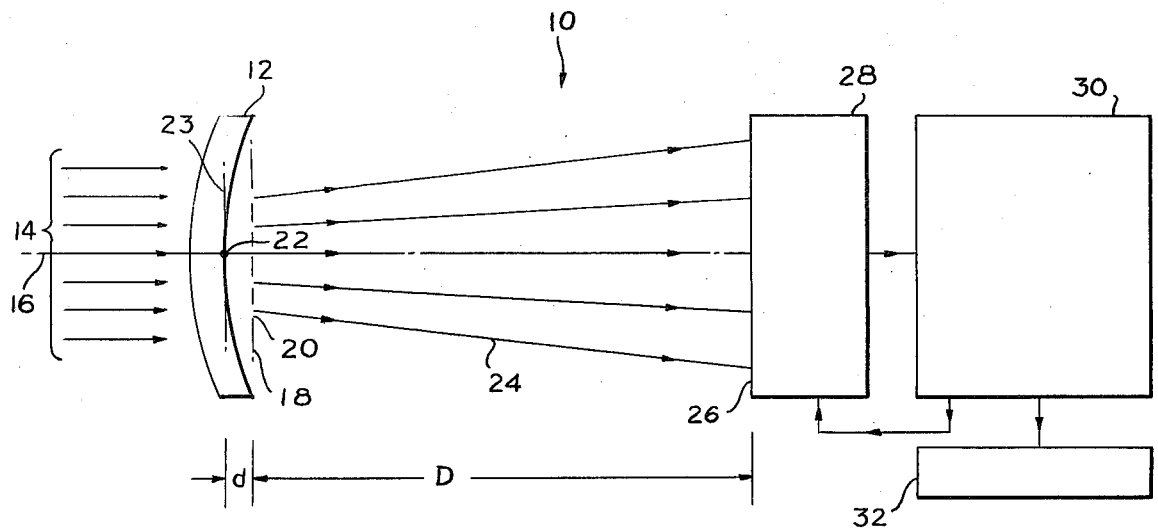
FIG. 1 is a schematic diagram of apparatus embodying the present invention in a manner so that automatic operation is achieved.

In referring to the various figures of the drawing hereinbelow, like reference numerals will refer to identical parts of the apparatus.

Referring initially to FIG. 1, there is shown an apparatus 10 for determining the refractive characteristics of a lens 12. The lens 12 is inserted into a collimated beam of light 14 in a position such that the lens geometrical axis is approximately aligned with the optical axis 16 of the apparatus. The collimated beam of light is parallel to and surrounds the system optical axis 16. A mask 18 is located, in this embodiment, in the refracted beam of light exiting from the rear face of the lens 12. The mask 18 has a plurality of at least three non-colinear, small apertures 20 therein which select a like plurality of rays 24 from the refracted bundle. The mask is located a known distance $d$ behind the back vertex 22 of the lens 12. At a known distance D downstream from the mask 18 is disposed a display surface 26. Display surface 26 is orthogonal to the apparatus optical axis 16 and is sufficiently extensive to intersect all of the selected rays 24 from the refracted bundle.

The display surface 26 may be, for example, the front surface of a scanner 28. The scanner 28 locates the points of intersection of the selected rays 24 on the display surface 26, digitizes the information, and transmits this data to an electronic computer 30. The electronic computer 30 has information stored therein which allows it to compute from the digitized positional data received from the scanner 28 the precise refractive characteristics of the lens 12. The computer 30 is able to control the scanning of scanner 28 in order to control the data rate from the scanner. The refractive characteristics of the lens 12 are derived from the computer 30 through a standard print out device 32.

Figure 2:
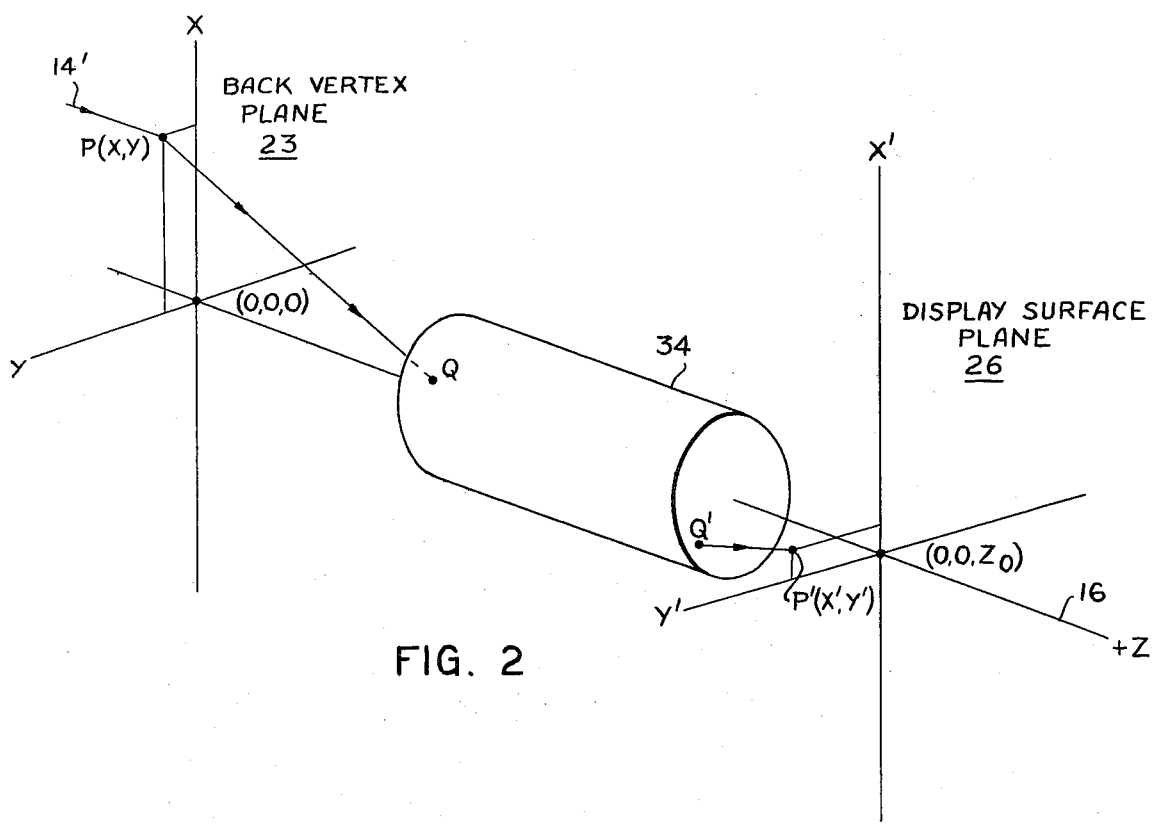
FIG. 2 is an isometric schematic representation useful in explaining the principles involved in the present invention.

The fundamentals of the method of the present invention and of the apparatus set forth in FIG. 1 may be best described by considering the $x,y,z$ coordinate system of FIG. 2. The $z$ axis of this coordinate system corresponds to the optical axis 16 of the system shown in FIG. 1. The test lens is placed with its back vertex at the origin $(0,0,0)$ and with its concave surface facing the $+z$ direction. The test lens is illuminated by collimated light from a source on the $-z$ axis. The display surface plane 26 parallel to the $x,y$ plane intersects the $z$ axis at $(0,0,z_0)$ and contains the $x',y'$ coordinate system parallel to the $x,y$ system. The space between the planes $z=0$ and $z=z_0$ constitutes an optical system which may consist of free space or it may consist of a series of discrete optical elements. In the latter event, such a discrete system should be centered, non-astigmatic, and distortion free. The nature of this optical system influences only the translation of the immediate results into back vertex powers, and prism powers.

Consider initially a ray 14' of the incident collimated light which intersects the back vertex plane 23 ($z=0$) at the point P. At this plane it is refracted by the lens 12 under test into the ray PQ which intersects the optical system 34 at Q. P and Q may be coincident. The refracted ray immerges from the optical system 34 at Q' and intersects the plane of the display screen 26 ($z=z_0$) at P'. Again, P' and Q' may be coincident. If the test lens is geometrically centered and free of prism, it may be shown, using paraxial optics that the coordinates of P' are $$x' = Ax + Cy$$
$$y' = Cx + By$$

where $x,y$ are the coordinates of P. If the test lens does have prism power, then P' is described by $$x' = Ax + Cy + \zeta_1$$
$$y' = Cx + By + \zeta_2$$

The quantities A, B, and C are dimensionless numbers which described the combined refractive effects of the test lens and the intervening optical system. The quantities $\zeta_1$ and $\zeta_2$ describe the transverse shift of the refracted rays due to the prism in the test lens. Equation (1) is a general linear transformation which may be written conveniently in matrix notation $$\begin{pmatrix} x' \\ y' \end{pmatrix} = \begin{pmatrix} A \\ C \end{pmatrix} \begin{pmatrix} C \\ B \end{pmatrix} \begin{pmatrix} x \\ y \end{pmatrix} + \begin{pmatrix} \zeta_1 \\ \zeta_2 \end{pmatrix} \quad (2)$$

If $x'$, $y'$ are measured for each of three identifiable pairs of values of $x,y$, there result six equations in the five unknowns A, B, C, $\zeta_1$, and $\zeta_2$. Hence, such a measurement serves to determine these quantities.

The eigenvalues of the matrix are $$\mu_1 = \frac{A+B}{2} + \sqrt{\left(\frac{A-B}{2}\right)^2 + C^2}$$
$$\mu_2 = \frac{A+B}{2} - \sqrt{\left(\frac{A-B}{2}\right)^2 + C^2} \quad (3)$$

The principal back vertex powers of the test lens are related to these eigenvalues. The orientation of the principal axis system of the lens is given by the orientation of the eigenvectors of the matrix. The prism power and prism orientation are determined by $\zeta_1$ and $\zeta_2$. The specific relationship between the principal back vertex powers and the eigenvalues is determined by the nature of the optical system 34, as is the relation between $\zeta_1$ and $\zeta_2$ and the lens prism properties.

In the embodiment shown in FIG. 1, the optical system 34 consists of free space. The display surface 26 of the scanner 28 is photosensitive such as on an image disector or a TV camera. The scanner is used to determine the coordinates of the intersection of the several rays with the display surface 26. These coordinates must be converted into digital form and organized into appropriate "words" by an electronic interface and then deposited in the working memory of the electronic computer 30. The electronic computer contains a program for 1. determining A, B, C, $\zeta_1$, and $\zeta_2$ from the measured values of $x',y'$.
2. determining from A, B, and C, the eigenvalues and eigenvectors of the matrix,
3. determining the principal back vertex powers and principal axis orientation from the matrix eigenvalues and eigenvectors, and
4. determining the prism power and prism orientation from $\zeta_1$ and $\zeta_2$.

If $\mu_1$ and $\mu_2$ are the eigenvalues as in Equation (3), then for the present example, the principal back vertex powers are given by $$P_1 = \frac{1-\mu_1}{D+d(1-\mu_1)}$$
$$P_2 = \frac{1-\mu_2}{D+d(1-\mu_2)} \quad (4)$$

The angular orientation of the principal axes of the lens in the $x,y$ system is given by $$\chi_1 = \tan^{-1} - \left(\frac{C}{B-\mu_1}\right)$$
$$\chi_2 = \chi_1 + 90° \quad (5)$$

The magnitude of the prism power is given by $$\Delta = \frac{100 \sqrt{\zeta_1^2 + \zeta_2^2}}{D} \quad (6)$$

and the prism orientation is given by $$\phi = \tan^{-1} \left(\frac{\zeta_1}{\zeta_2}\right)$$

Figure 3:
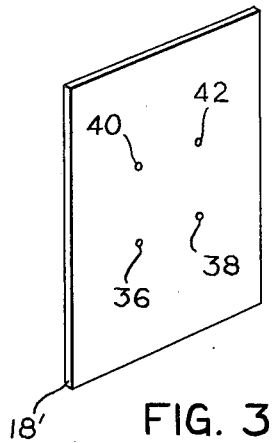
FIG. 3 is an isometric view of a mask for use in selecting rays in the present invention.

A preferred mask 18' for use in the embodiment of the present invention is shown in FIG. 3. The mask 18' is constructed of an opaque material having four pinhole apertures 36, 38, 40 and 42 therein. The four apertures are disposed in an accurately described square array.

With no test lens 12 positioned in the apparatus of FIG. 1, the collimated rays selected by the apertures in the mask 18' intersect the display surface 26 and the points of incidence thereon form a geometrically congruent square.

Figure 4:
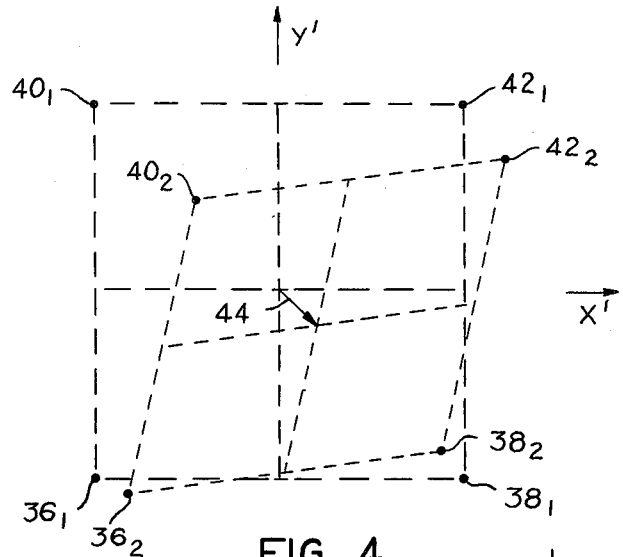
FIG. 4 is a representation of a pattern such as might be found on the display screen both with and without a test lens in place.

In order to evaluate the foregoing equations for A, B, and C in terms of the measured position of the refracted points of incidence, it is necessary to know which aperture in the mask 18 gives rise to each of the points of incidence on the display surface 26. If the mask 18' shown in FIG. 3 is utilized and a collimated beam of light is passed through the mask from right to left, a pattern will be generated on the screen 26 as shown in FIG. 4 by the square array denoted $40_1$, $42_1$, $38_1$, and $36_1$ reading clockwise from the upper lefthand corner. There are basically four different orderings that the refracted points of incidence on the display surface 26 depending upon the location of the display surface 26 with respect to the real foci produced by the test lens 12 when inserted in the system. If no real focus (either point or line) occurs between the mask and the display surface 26, the ordering of the refracted spots will be $40_x$, $42_x$, $38_x$, and $36_x$ (reading clockwise once again), i.e., the same as the ordering of the holes in the mask. If a single line focus parallel to the $x$ axis occurs between the mask and the display surface 26, the ordering is $36_x$, $38_x$, $42_x$, and $40_x$; a single line focus parallel to the $y$ axis produces the ordering $42_x$, $40_x$, $36_x$, and $38_x$. If a single point focus or both line foci between the mask and the display surface 26, the ordering $38_x$, $36_x$, $40_x$, and $42_x$ is produced. Negative lenses produce no real foci and consequently produce the unscrambled ordering $40_x$, $42_x$, $38_x$, and $36_x$. It is clearly desirable to have the same ordering for all lenses. Thus, the preferred ordering of the refracted spots is $40_x$, $42_x$, $38_x$, and $36_x$, i.e., the same as the mask. This preferred ordering scheme is insured in the preferred embodiment of the invention if the distance from the back vertex 22 of the test lens 12 to the display surface 26 $(d+D)$ is less than the shortest single back focal length of any lens which is desired to be tested.

Referring once again to FIG. 4, it will be seen that the refracted array on the display surface 26 forms a parallelogram $40_2$, $42_2$, $38_2$, $36_2$ the corners of which are in the same order as the original unrefracted pattern. If the test lens has pure spherical correction, the refracted pattern is again a square array centered on the unrefracted pattern. If cylinder correction is present in the lens, the refracted pattern is a parallelogram again centered on the unrefracted square array. If prism power is present in the test lens, the entire refracted array is shifted laterally from that of the unrefracted array as shown in FIG. 4 by the arrow 44.

Figure 5:
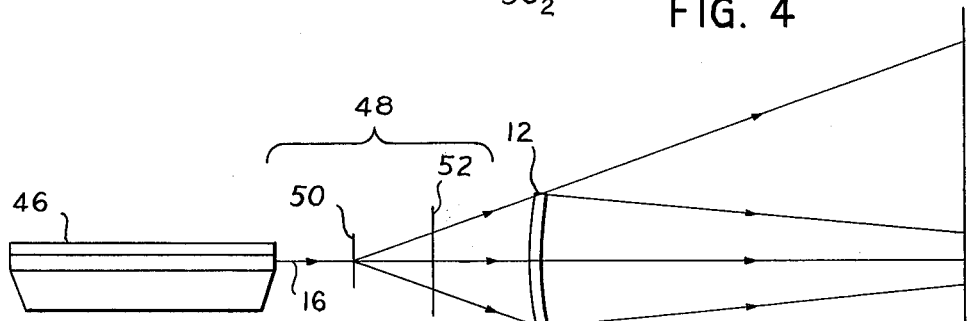
FIG. 5 is a schematic diagram of an alternate means of performing the invention.
Figure 6:
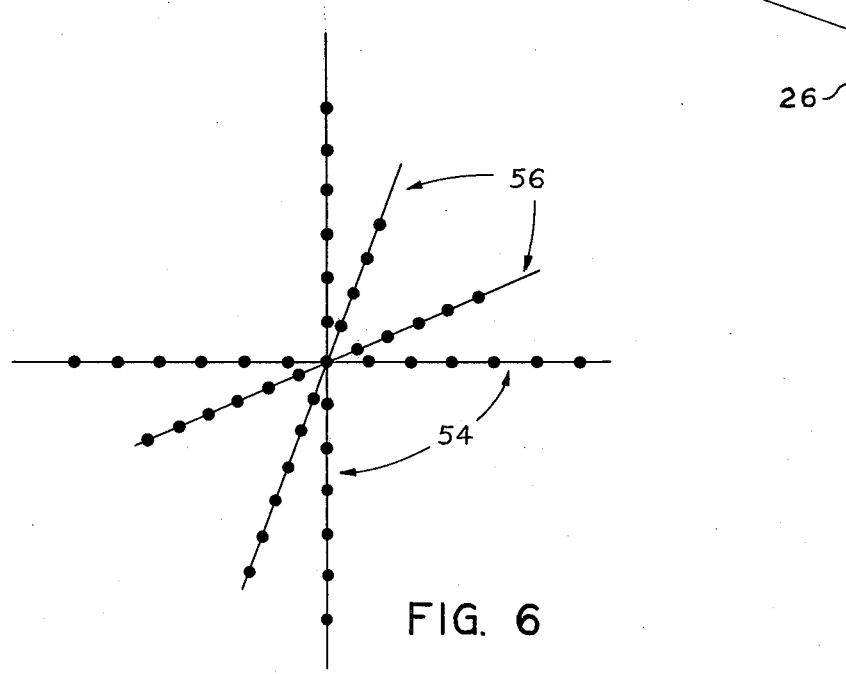
FIG. 6 is a representation of the refracted and unrefracted patterns displayed on the display surface utilizing the apparatus shown in FIG. 5.

A second embodiment of the invention is shown in FIG. 5. A collimated beam of light is derived from a He-Ne gas laser aligned along the system optical axis 16. A modified means of ray selection 48 is interposed between the laser 46 and the test lens 12. The means 48 includes a mask 50 consisting of an opaque surface containing a regular square array of small circular holes therein, and a cruciform aperture 52 interposed between the mask 50 and the test lens 12. In this embodiment, the rays are selected from the collimated beam of light prior to passing through the test lens onto the display screen 26. The cruciform aperture 52 serves to block out all but the two principal orders from the mask 50 which functions in the manner of a difraction grating. When no test lens is present in the apparatus, an unrefracted cross 54, see FIG. 6, is found on the display surface 26. When the test lens, in this instance having only cylindrical and spherical correction, is placed in the apparatus, the refracted cross 56 shown in FIG. 6 is found on the display surface 26.

The embodiment shown in FIG. 1 has certain advantages over the embodiment of FIG. 5. Where the rays are selected prior to refraction by the test lens, either a priori knowledge about the test lens is needed to eventually arrive at values for the back vertex power or the measurement must be performed at each of two distinct lens to display surface distances or a correction table must be generated and utilized. If the rays selection is performed after refraction by the test lens, then back vertex powers may be inferred directly from the generated data.

As can be seen from FIG. 6, a great many more points of incidence of selected rays are found using the mask of FIG. 5 as compared to that in FIG. 1. This has the advantage that a great deal more data is generated thereby increasing the accuracy of the measurements. However, at the same time, the rate at which the data can be processed by a given electronic computer is increased in direct proportion to the number of bits of data generated. Therefore, a means of ray selection such as shown in FIG. 5 would require either a significant increase in time of processing or an electronic computer 30 is necessary which can perform the required computations at a far faster rate. Both of these alternatives become expensive, one in time and the other in economic considerations.

A further consideration given to the mask configuration is to limit the ray selection to the area comprising approximately a six millimeter diameter circle in the center of the lens. The primary reason for such a restriction is that the present lens testing instruments described hereinabove perform their measurements on this central area of the lens and when the refractive characteristics are computed over the entire surface of the lens, they vary somewhat from those measured through this central area. Therefore, in order to provide lenses tested via this means to dispensers and doctors all of whose equipment is calibrated in terms of corrections corresponding to those measured through the central area, it is preferable to limit the measurements within this method to this central area.

While there has been shown and described what are considered to be preferred embodiments of the present invention, it will be obvious to those skilled in the art that various changes and modifications may be made therein without departing from the invention.

What is claimed is:

1. Apparatus for determining the refractive characteristics of a lens comprising:
    a source of collimated light which produces a bundle of collimated rays parallel to and surrounding an apparatus optical axis;
    means for positioning the lens in the bundle of collimated rays with its geometrical axis approximately aligned with the apparatus optical axis;
    means disposed adjacent to the lens for selecting a spaced plurality of at least three non-coplanar rays from the bundle passing through and being refracted by the lens; and
    a display surface disposed orthogonal to the apparatus optical axis and at a predetermined distance behind the lens so that the selected refracted rays are incident thereon, the display surface having a coordinate system thereon by which the displacement and direction of displacement are ascertained for the positions of incidence of the selected refracted rays relative to the positions of incidence of the selected rays on the display surface before the lens is positioned, the displacements and directions of displacement of the positions of incidence of the selected refracted rays being indications of the refractive characteristics of the lens.

2. Apparatus according to claim 1, wherein the lens is an ophthalmic lens and the refractive characteristics to be measured include the principal back vertex powers, the astigmatic axis orientation, the prism power, and the prism orientation and wherein the ophthalmic lens is positioned within the apparatus with the convex surface facing the source of collimated light.

3. Apparatus according to claim 2, wherein the means for selecting rays is disposed optically behind and selects rays previously refracted by the ophthalmic lens.

4. Apparatus according to claim 3, wherein the predetermined distance is measured from the back vertex of the ophthalmic lens and is less than the shortest back focal length for any ophthalmic lens desired to be tested.

5. Apparatus according to claim 4, wherein the rays selected are selected near the center of the ophthalmic lens.

6. Apparatus according to claim 5, wherein the rays are selected from an area having a diameter of approximately 6 millimeters.

7. Apparatus according to claim 2, wherein the means for selecting rays is an opaque mask having a plurality of at least three pinhole apertures therein.

8. Apparatus according to claim 7, wherein the mask has four apertures therein arranged in the form of a square.

9. Apparatus according to claim 2, wherein the means for selecting rays is disposed optically in front of the ophthalmic lens and selects rays directly from the collimated bundle.

10. Apparatus according to claim 1, wherein there is also included an optical system aligned on the apparatus optical axis and interposed optically in front of the display surface to adjust the physical length of the apparatus.

11. Apparatus according to claim 10, wherein the optical system is free from distortion and astigmatism.

12. Apparatus according to claim 1, wherein the source of collimated light includes a laser.

13. Apparatus according to claim 12, wherein the laser is a He-Ne laser and the source further includes a collimating lens disposed optically in the output beam from the He-Ne laser to provide an accurately collimated bundle of rays.

14. A method for determining the refractive characteristics of a lens comprising the steps of:
   projecting a bundle of collimated rays parallel to and surrounding an optical axis;
   selecting a plurality of at least three rays from the bundle of collimated rays;
   placing a display surface orthogonal to the optical axis so that positions of incidence are located thereon for each of the selected rays;
   inserting the lens into the collimated rays at a predetermined optical distance from the display surface, the lens being aligned on the optical axis; and
   measuring the displacement and direction of displacement of the position of incidence of each of the selected rays on the display surface caused by insertion of lens, the displacement and direction of displacement of the positions of incidence being indications of the refractive characteristic of the lens.

15. A method according to claim 14, wherein the lens is inserted into the collimated rays prior to the selection of rays.

* * * * *